US009122032B2

(12) United States Patent
Tada et al.

(10) Patent No.: US 9,122,032 B2
(45) Date of Patent: Sep. 1, 2015

(54) LIGHT RECEIVING DEVICE

(71) Applicant: PANASONIC INTELLECTUAL PROPERTY MANAGEMENT CO., LTD., Osaka (JP)

(72) Inventors: Naoto Tada, Osaka (JP); Suguru Nakao, Hyogo (JP); Shuji Yamashita, Nara (JP); Hiromi Kanzawa, Osaka (JP); Kazuya Honda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/548,284

(22) Filed: Nov. 19, 2014

(65) Prior Publication Data

US 2015/0078722 A1    Mar. 19, 2015

Related U.S. Application Data

(63) Continuation of application No. PCT/JP2013/004687, filed on Aug. 2, 2013.

(30) Foreign Application Priority Data

Feb. 12, 2013  (JP) ................................. 2013-023990

(51) Int. Cl.
  *G02B 6/10*  (2006.01)
  *G02B 6/42*  (2006.01)
  (Continued)

(52) U.S. Cl.
  CPC ............... *G02B 6/4295* (2013.01); *G02B 6/10* (2013.01); *G02B 6/42* (2013.01); *G02B 6/4214* (2013.01);
  (Continued)

(58) Field of Classification Search
  CPC .......... G02B 6/10; G02B 6/42; G02B 6/4214; H04N 5/64

USPC .......... 385/33, 88–90; 362/601, 31, 615, 245, 362/551
See application file for complete search history.

(56) References Cited

U.S. PATENT DOCUMENTS 4,836,639 A * 6/1989 Shamoto et al. ............... 385/109
5,810,463 A * 9/1998 Kawahara et al. .......... 250/227.2
(Continued)

FOREIGN PATENT DOCUMENTS

JP    08-191493 A    7/1996
JP    10-243481 A    9/1998
(Continued)

OTHER PUBLICATIONS

International Search Report issued in International Application No. PCT/JP2013/004687 dated Oct. 22, 2013, with English Translation.

*Primary Examiner* — Akm Enayet Ullah
(74) *Attorney, Agent, or Firm* — McDermott Will & Emery LLP

(57) ABSTRACT

A light receiving device has a light receiving section for receiving a remote control signal light beam, and a light guide section for guiding the light beam to the light receiving section. The light guide section has a first reflection surface for reflecting the light beam to the light receiving section, the first reflection surface being disposed to oppose obliquely at a sharp angle to an entrance plane, and a second reflection surface for guiding the remote control signal light beam, the second reflection surface being disposed between the entrance plane and the first reflection surface. The first reflection surface includes a circular arc curved surface curved outward in a part closer to the entrance plane and farther from the light receiving section, and a linear inclined surface in a part approaching the light receiving section from the curved surface.

4 Claims, 4 Drawing Sheets

(51) Int. Cl.
*G08C 23/04* (2006.01)
*H04N 5/44* (2011.01)
*H04N 5/64* (2006.01)
*H04N 21/422* (2011.01)

(52) U.S. Cl.
CPC .............. *G08C 23/04* (2013.01); *H04N 5/4403* (2013.01); *H04N 5/64* (2013.01); *H04N 21/42204* (2013.01)

(56) References Cited

U.S. PATENT DOCUMENTS

| | | | |
|---|---|---|---|
| 6,417,508 B1* | 7/2002 | Ogura et al. | 250/227.2 |
| 6,455,834 B2* | 9/2002 | Fujimoto et al. | 250/208.1 |
| 7,805,042 B2* | 9/2010 | Ushiwata et al. | 385/129 |
| 2003/0175038 A1 | 9/2003 | Maeda et al. | |
| 2005/0007753 A1* | 1/2005 | Van Hees et al. | 362/31 |
| 2006/0187676 A1* | 8/2006 | Ishikura | 362/615 |
| 2008/0112166 A1* | 5/2008 | Kakizaki et al. | 362/245 |
| 2015/0055364 A1* | 2/2015 | Kosugi et al. | 362/551 |

FOREIGN PATENT DOCUMENTS

| | | |
|---|---|---|
| JP | 2001-266693 A | 9/2001 |
| JP | 2003-274466 A | 9/2003 |
| JP | 2008-078896 A | 4/2008 |

* cited by examiner

LIGHT RECEIVING DEVICE

RELATED APPLICATIONS

This application is a Continuation of International Application No. PCT/JP2013/004687, filed on Aug. 2, 2013, which in turn claims the benefit of Japanese Application No. 2013-023990, filed on Feb. 12, 2013 the disclosures of which Applications are incorporated by reference herein.

BACKGROUND

1. Field

The present technique relates to a light receiving device which receives a remote control signal light beam sent from a wireless remote controller for remotely controlling a controlled device, and more particularly to a light receiving device used in a thin display device.

2. Description of the Related Art

Thin display devices using the liquid crystal display or the like, such, for example, as television sets and monitors for various advertisements, have become popularized in standard homes and commercial facilities. Along with such popularization, the thin display devices have become used in a variety of installation patterns. For example, they are used in such a pattern as being installed on a wall of a house, being placed on or built into furniture, or being suspended from a ceiling.

Also, depending on a variety of usage patterns taking advantage of the thin display devices, such a products is recently favored that has an appearance design with a narrow frame, or a large display area and compact outside dimensions.

On the other hand, in order to respond to the thin-type design and the variety of installation patterns, it has become common for the thin display devices to use a remote controller to perform operations including power on/off, channel selection, input signal selection, and the like (see Unexamined Japanese Patent Publication No. 2008-78896).

Along with the needs for a product having an external appearance design with a thinner body and a narrow frame in the thin display devices, which are generally operated by a remote controller, as described above, a light receiving device used in each thin display device for receiving a light beam from a remote controller is required to be compact in size and favorable in photosensitivity.

SUMMARY

A light receiving device according to the present technique includes: a light receiving section for receiving a remote control signal light beam, the light receiving section being disposed in a controlled device which is remotely controllable by using a remote controller; and a light guide section for guiding the remote control signal light beam to the light receiving section. The light guide section has: an entrance plane from which the remote control signal light beam enters; a first reflection surface for reflecting the remote control signal light beam to the light receiving section, the first reflection surface being disposed to obliquely oppose to the entrance plane; a second reflection surface for guiding the remote control signal light beam entered from the entrance plane to the first reflection surface, the second reflection surface being disposed between the entrance plane and the first reflection surface; and an exit plane for emitting the remote control signal light beam to the light receiving section, the exit plane being disposed between the first reflection surface and the light receiving section. The first reflection surface includes a circular arc curved surface which is curved outward in a part closer to the entrance plane and farther from the light receiving section, and a linear inclined surface in a part approaching the light receiving section from the curved surface.

DETAILED DESCRIPTION

Hereinafter, an exemplary embodiment of the present technique will be described with reference to the accompanying drawings, without any intention of limiting the present technique to the exemplary embodiment. However, unnecessarily detailed description may occasionally be omitted. For example, detailed description of well-known matters and redundant description of substantially the same configurations may occasionally be omitted. This is to avoid the following description from becoming unnecessarily redundant, and to ease understanding of any person skilled in the art.

Also, the inventors intend to provide the following description and the accompanying drawings to allow any person skilled in the art to fully understand the present technique, and do not intend to limit the subject matter described in the claims by the following description.

Figure 1:
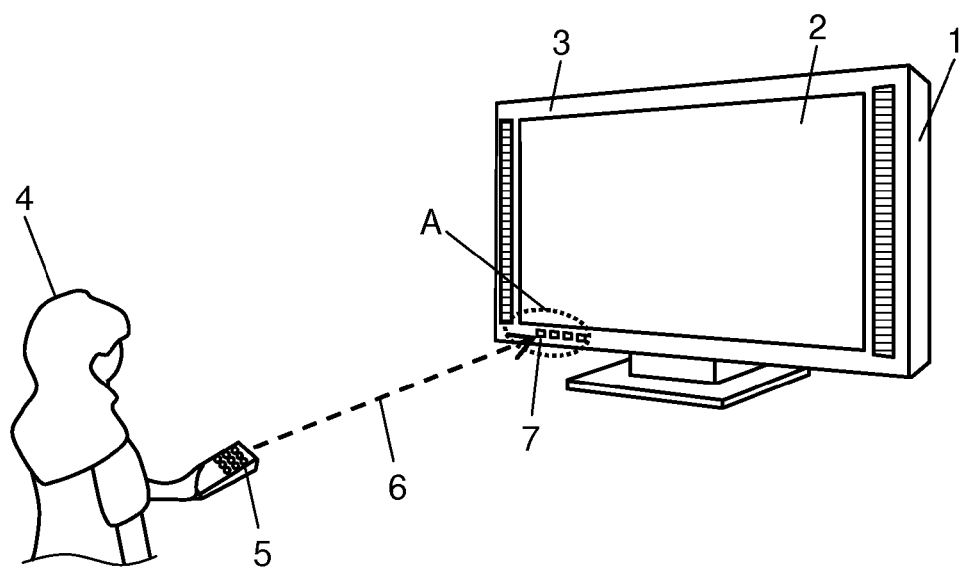
FIG. 1 is a perspective view showing a thin display device with a light receiving device according to an embodiment of the present technique.
Figure 2:
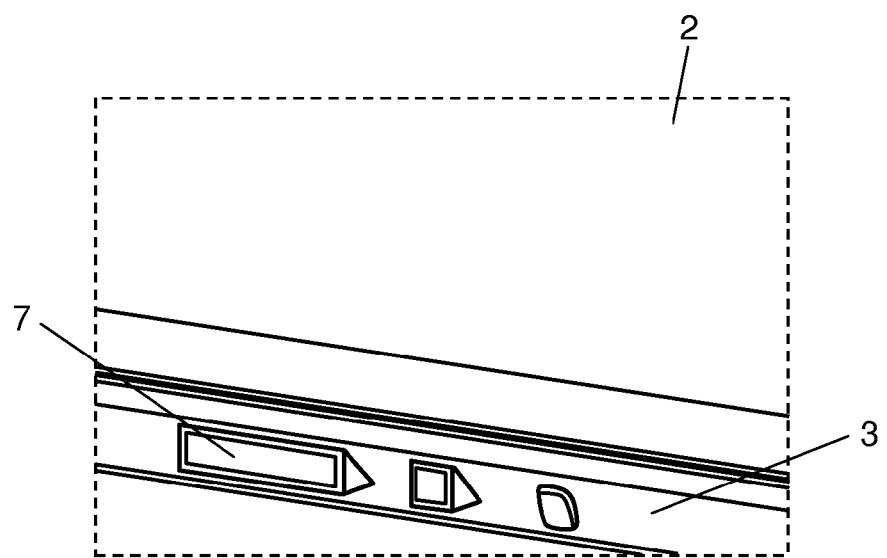
FIG. 2 is an enlarged view of portion A shown in FIG. 1.

FIG. 1 is a perspective view showing a thin display device with a light receiving device according to an embodiment of the present technique. FIG. 2 is an enlarged view of portion A shown in FIG. 1.

Referring to FIG. 1 and FIG. 2, flat panel thin display device 1, which is a controlled device, has housing 3 with a narrow frame provided around periphery of screen 2. Light receiving device 7 for receiving remote control signal light beam 6 such as an infrared signal from remote controller 5 which is operated by user 4 is disposed at a lower side part of housing 3.

Figure 3:
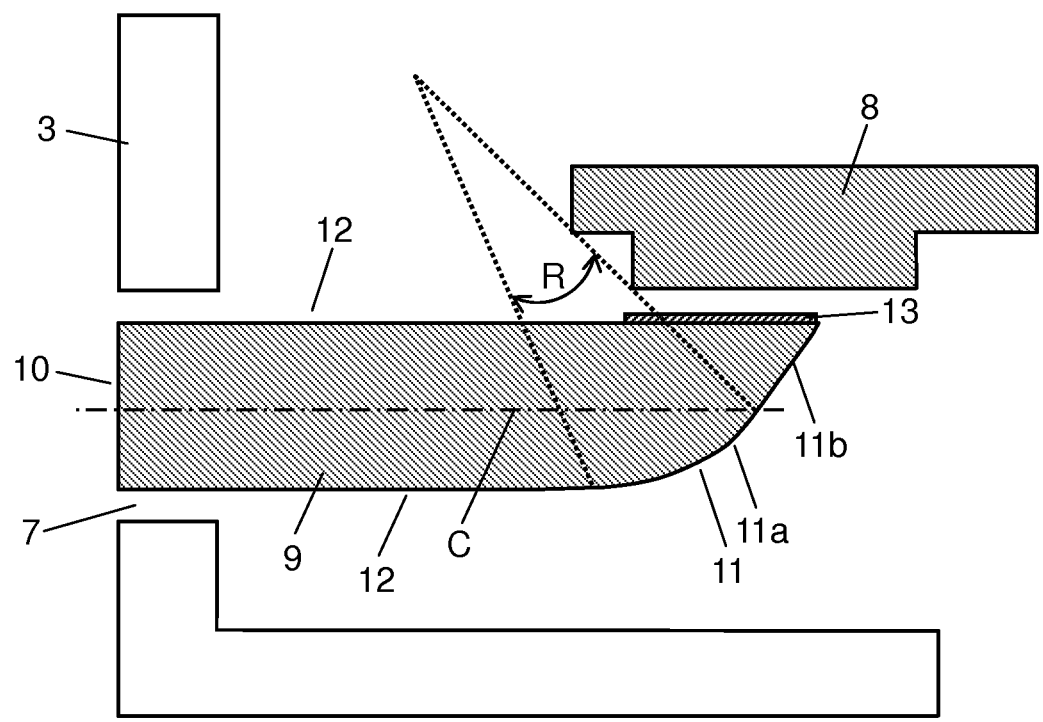
FIG. 3 is a sectional view showing a light receiving device according to an embodiment of the present technique.

FIG. 3 is a sectional view showing a light receiving device according to an embodiment of the present technique.

Referring to FIG. 3, light receiving device 7 has light receiving section 8 which is configured, for example, by a photo-detecting sensor for receiving the remote control signal light beam, and columnar light guide section 9 which is a light guide member made of an acrylic resin for guiding remote control signal light beam 6 to light receiving section 8. Light guide section 9 has entrance plane 10 from which remote control signal light beam 6 enters, first reflection surface 11 for reflecting remote control signal light beam 6 to light receiving section 8, first reflection surface 11 being disposed to obliquely oppose to entrance plane 10 at a specified angle, second reflection surface 12 for guiding remote control signal light beam 6 entered from entrance plane 10 to first reflection surface 11, second reflection surface 12 being disposed between entrance plane 10 and first reflection surface 11, and exit plane 13 for emitting remote control signal light beam 6 to light receiving section 8, exit plane 13 being disposed between first reflection surface 11 and light receiving section 8.

First reflection surface 11 of light guide section 9 includes circular arc curved surface 11a which is curved outward in a part (a range indicated by dotted line R in FIG. 3) closer to entrance plane 10 and farther from light receiving section 8, relative to center line C in an axial direction of light guide section 9 as a border, and linear inclined surface 11b in a part approaching light receiving section 8 from curved surface 11a.

Also, second reflection surface 12 of light guide section 9 is formed on an inner surface between entrance plane 10 and first reflection surface 11. Also, first reflection surface 11 is formed at an angle of approximately 45° with respect to second reflection surface 12.

Figure 4:
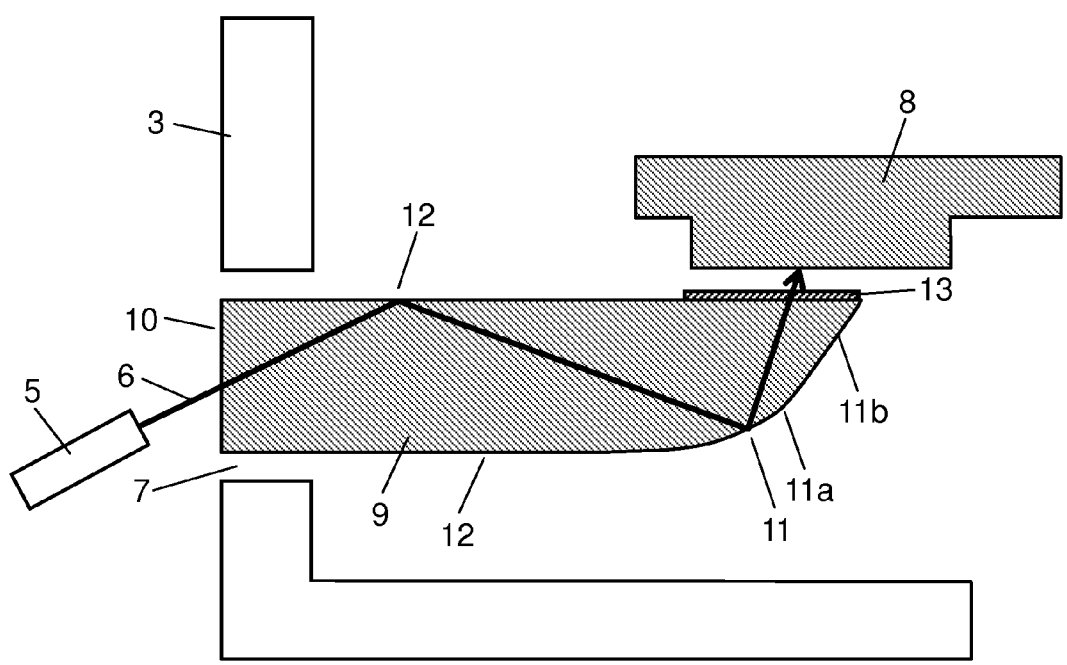
FIG. 4 is an explanatory diagram showing an example of propagation of a remote control signal light beam in a light receiving device according to an embodiment of the present technique.

FIG. 4 is an explanatory diagram showing an example of propagation of a remote control signal light beam in the light receiving device according to the embodiment of the present technique. As shown in FIG. 4, remote control signal light beam 6 which has been transmitted from remote controller 5 and entered from entrance plane 10 of light guide section 9 propagates in light guide section 9 while being totally reflected by second reflection surface 12 provided on the inner surface of light guide section 9 to reach first reflection surface 11. Remote control signal light beam 6 having reached first reflection surface 11 is reflected by first reflection surface 11 at an almost right angle, and emitted from exit plane 13 of light guide section 9 to reach light receiving section 8.

Here, first reflection surface 11 is in such a shape that has circular arc curved surface 11a and linear inclined surface 11b. Curved surface 11a of first reflection surface 11 forms a light path for directly reflecting remote control signal light beam 6 totally reflected from second reflection surface 12 to exit plane 13, and another light path for reflecting remote control signal light beam 6 totally reflected from second reflection surface 12 to linear inclined surface 11b so that remote control signal light beam 6 is reflected through linear inclined surface 11b to exit plane 13. This allows remote control signal light beam 6 entered from entrance plane 10 to be efficiently guided to exit plane 13.

Figure 5:
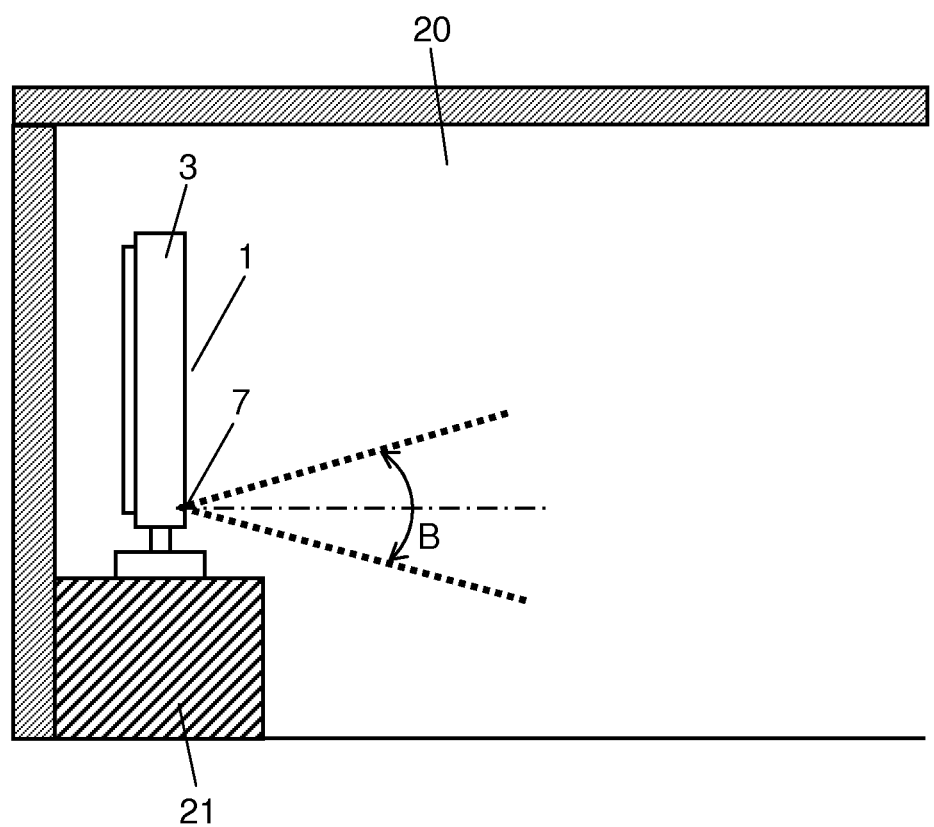
FIG. 5 is an explanatory diagram for explaining photosensitivity of a light receiving device according to an embodiment of the present technique.

FIG. 5 is an explanatory diagram for explaining photosensitivity of the light receiving device according to an embodiment of the present technique. As shown in FIG. 5, light receiving device 7 according to the present technique was mounted in thin display device 1 placed on stand 21 in standard living room 20, and a range in which thin display device 1 can be operated by remote controller 5 was investigated by changing the vertical angle of the position of remote controller 5 viewed from light receiving device 7 (angle B shown in FIG. 5), and changing the distance from remote controller 5 to light receiving device 7.

In this investigation, light guide section 9 of light receiving device 7 was configured by an acrylic resin light guide member having a width of 3 mm and a length of 15 mm. Each of circular arc curved surface 11a and inclined surface 11b of first reflection surface 11 was made to have a length of 1.5 mm in the thickness direction of light guide section 9. Also, first reflection surface 11 was made to be inclined by an inclination angle of 45° with respect to the axial direction of light guide section 9.

With the light receiving apparatus according to the present technique, it was possible to operate thin display device 1 by using remote controller 5 at a distance of about 15 m under condition of angle B in FIG. 5 being within a range of 20° (±10° in the vertical direction). As described above, it is possible to widen the incident angle of the remote control signal light beam necessary to obtain an adequate photosensitivity, so that a light receiving device having a favorable photosensitivity can be provided.

Further, another sample of light guide section 9 was prepared by changing the radius of circular arc curved surface 11a of first reflection surface 11, and subjected to a similar investigation. As a result, it appeared preferable that the radius of curvature of circular arc curved surface 11a of first reflection surface 11 is equal to or larger than the thickness of light guide section 9.

As described hereinabove, in the light receiving device according to the present technique, light guide section 9 has first reflection surface 11 for reflecting remote control signal light beam 6 to light receiving section 8, first reflection surface 11 being disposed to oppose obliquely at a sharp angle to entrance plane 10 from which remote control signal light beam 6 enters, and second reflection surface 12 for guiding remote control signal light beam 6 entered from entrance plane 10 to first reflection surface 11, second reflection surface 12 being disposed between entrance plane 10 and first reflection surface 11. First reflection surface 11 includes circular arc curved surface 11a which is curved outward in a part closer to entrance plane 10 and farther from light receiving section 8, and linear inclined surface 11b in a part approaching light receiving section 8 from curved surface 11a.

With this configuration, when a thin display device with a light receiving device is operated by a remote controller, it is possible to widen the incident angle of the remote control signal light beam necessary to obtain an adequate photosensitivity, so that a light receiving device having a favorable photosensitivity can be provided.

Incidentally, light guide section 9 described in the above exemplary embodiment is such an example in which exit plane 13 is disposed at nearly a right angle with respect to entrance plane 10. However, light guide section 9 may have a shape other than this shape to obtain the similar effects. For example, light guide section 9 may be shaped like letter J in which exit plane 13 and entrance plane 10 are directed to the same direction, and include another third reflection surface disposed between first reflection surface 11 and exit plane 13 for reflecting remote control signal light beam 6 reflected from first reflection surface 11 to exit plane 13, to obtain the similar effects as those of the above exemplary embodiment.

In the foregoing description, an exemplary embodiment has been described as an example of the technique according to the present disclosure. The detailed description and accompanying drawings have been provided for that purpose.

Accordingly, components shown in the accompanying drawings and described in the detailed description include not only components which are essential to solve the problems, but also components which are not essential to solve the problems, but are used for exemplifying the above-mentioned technique. Therefore, those non-essential components should not be immediately construed as essential for the reason that the non-essential components are shown in the accompanying drawings or described in the detailed description.

Also, since the above-described exemplary embodiment is to exemplify the technique according to the present disclosure, various modifications, substitutions, additions or omissions may be made within the scope of the claims or equivalents thereof.

What is claimed is:

1. A light receiving device comprising:
   a light receiving section for receiving a remote control signal light beam, the light receiving section being disposed in a controlled device which is remotely controllable by using a remote controller; and a light guide section for guiding the remote control signal light beam to the light receiving section, wherein the light guide section includes:

an entrance plane from which the remote control signal light beam enters;

a first reflection surface for reflecting the remote control signal light beam to the light receiving section, the first reflection surface being disposed to obliquely oppose to the entrance plane;

a second reflection surface for guiding the remote control signal light beam entered from the entrance plane to the first reflection surface, the second reflection surface being disposed between the entrance plane and the first reflection surface; and an exit plane for emitting the remote control signal light beam to the light receiving section, the exit plane being disposed between the first reflection surface and the light receiving section, and wherein the first reflection surface includes a circular arc curved surface which is curved outward in a part closer to the entrance plane and farther from the light receiving section, and a linear inclined surface in a part approaching the light receiving section from the curved surface.

2. The light receiving device according to claim 1, wherein a radius of curvature of the circular arc curved surface of the first reflection surface is equal to or larger than a thickness of the light guide section.

3. The light receiving device according to claim 1, wherein the second reflection surface of the light guide section is formed on an inner surface between the entrance plane and the first reflection surface in the light guide section.

4. The light receiving device according to claim 1, wherein the light guide section is shaped like letter-J in which the exit plane and the entrance plane are directed to the same direction, and includes a third reflection surface for reflecting the remote control signal light beam reflected from the first reflection surface to the exit plane, the third reflection surface being disposed between the first reflection surface and the exit plane.

* * * * *